Patented May 2, 1950

2,506,099

UNITED STATES PATENT OFFICE 2,506,099

AIRBLAST QUICK FREEZING OF FOODSTUFFS

Harry A. Noyes, Watertown, Mass.

No Drawing. Application February 24, 1949,
Serial No. 78,229

2 Claims. (Cl. 62—173)

This invention relates to the art of freezing foodstuffs and particularly to the technics of operating airblast freezing of small units of foodstuff, where the pieces of fruit, berries, green peas, cut beans or other comestibles are placed, as by pouring, onto a tray with a foraminous bottom which confines a mass of such units so that they may be handled together and have the latent heat of freezing removed while the receptacle of foodstuff is handled as a unit.

The object of the invention is to give a means of making it easier to get the foodstuff units, after they are frozen and while they remain frozen, away from the surfaces that confined them while they are being frozen.

Another object is to speed up the operation of equipment used in a tray air-blast quick freezing process where the current difficulties of removing the frozen product from the holding container delay the operation of what would otherwise be efficient procedures.

Another object is to make possible the installation of more efficient handling devices and also automatic devices to control the travel of trays of foodstuff through the whole process cycle which includes loading the trays, freezing the foodstuffs, removing the trays from the freezing chamber, removing the frozen foodstuffs from the trays and returning the trays to the initial location, ready for reloading.

Air-blast is a commonly used method of quick freezing and while the amount of heat that is transferred by the change of one cubic foot of air one degree Fahrenheit is very small in comparison to the amount of heat required to change one cubic foot of water one degree Fahrenheit, it is practice to air-blast quick freeze with as low temperatures of the air as, for example, minus forty degrees Fahrenheit when the latent heat of freezing the foodstuff is removed, in quick freezing that foodstuff, at temperatures that are only a few degrees Fahrenheit below the freezing point of water.

Those considered skilled in the art of food freezing are not versed in all the principles of the natural sciences and the freezing art, therefore, can be improved by the invention of procedures involving certain principles that are not now the knowledge of those skilled in food freezing. It is pointed out here, so as to distinguish from other arts that the phenomena of lubrication are not the phenomena that are designated as changes of state of a substance. States of a substance being regularly designated by the terms liquid, solid and gaseous. Another industrial art is that of gluing objects together and this is the adhesion of substances by virtue of properties that often come under the term of "tackiness." In that art glues are mixtures of substances and the bonding regularly comes about by the removal of something from the mixture as, for example, water volatilizing or traveling out of the glue into the substances being treated.

Practices, in other arts, as illustrated above, are not to be confused with this invention for while it is true that water, in the presence of specific substances, has an adhering effect when it solidifies to ice when its latent heat of freezing is abstracted, it loses that acquired holding power when the latent heat of melting is added to the ice. Water is the substance that changes state, freezes, in the carrying out of food freezing. It is also true that the binding together of substances by the change of state of the common wetting substance, water, having its latent heat of freezing extracted is not the adhesion art for such is no more that the heat status of water as affected by substances dissolved in it that lower its freezing point.

There are well constructed air-blast quick freezing installations where there are ample sources of primary refrigeration that are used to cool rapidly moving air, which in turn is passed over the foodstuffs to be frozen. Heat abstracted from the foodstuffs raises the temperature of the air and the air is recooled and recirculated to abstract yet more heat. In one particular setup the space in which the air is circulated contains equipment for handling trays of foodstuffs and is connected with equipment for bringing in the trays for the freezing step as well as other equipment for taking the trays of frozen material out of the freezing chamber. The trays are delivered from the freezing chamber to a mechanical device which inverts the trays and, at this point the frozen foodstuff is supposed to drop into a hopper. The tray is then conveyed back to the original point, at which it was loaded with the foodstuff, to start another round.

The difficulty with this and similar processes is that the frozen foodstuff does not drop out of the inverted trays even when they are given quite severe mechanical thumping, therefore, the current art is that the whole process bogs down and soon becomes inoperable in the manner planned. In a particular case, the trays were forty-two inches by forty-two inches and one and a half inches deep. The bottoms were one fourth inch mesh wire screening.

The problem was to devise a means whereby the contact between the foodstuff units and the tray surface was such that—at some stage of the process after the quick freezing of the foodstuff—the tray might be efficiently separated from the frozen comestibles. An analysis of the liquid that wets both the comestible and the tray in the old process shows it to be very largely the chemical compound water with more water than the content of the comestible. It is found that some of the comestible juices and particles of comestible solid matter are either dissolved in or associated with it. Tests show that the composition of this liquid inherently causes binding of the foodstuffs to the trays because its melting temperature is higher than the melting temperature for the fruit. This makes it inherent that any heat that is added to free the foodstuffs from the trays goes into action to become the latent heat of melting of the foodstuffs. If the temperature at which the added heat is consumed as latent heat of melting, is to occur at the points of adhesion of the foodstuffs to the trays, the melting point of the solution directly in contact with the tray surfaces must be lower than that of the fruit. This invention is to coat the tray surfaces with such a solution. Certain compatible liquids with lower freezing temperatures than the fruits do have increased viscosities at the lowered temperatures but the substance that melts—on the heating, namely, water—lowers viscosities rapidly. Compatible in this invention means substances that are legally allowed to be present in the foodstuffs or which, when allowed by regulations, do not affect tastes appreciably.

While increased viscosity of the solution, having the low freezing temperature is not regularly desirable, it is not the detriment that it first appears to be, because in this invention, the increased viscosity increases the time that it takes for the water on the foodstuff units and the diluted juices to mix with the protecting solution. It is easy to have freezing taking place before this dilution proceeds very far. Natural pectin solutions in water and jellies—because of specific osmotic properties as well as low freezing points are compatible surfaces in many cases. Sugar and salt mixtures with low freezing temperatures and high concentrations are used also as the contacting agents between the tray surfaces and the foodstuffs. There are, also glycerine mixtures containing sugar but there is objection to glycerine in food products and also direct lubrication of the metal surfaces with low viscosity and low freezing temperature oils are included for there are mixtures of edible oils with sugar that are repellant to water and yet which give the required fluidities at the required points.

Trays must be physically constructed to avoid extra hinderances. They should not be so rough that indentations give frozen water direct grips to hold the frozen foodstuffs. The angle between the bottoms and the sides should not be less than ninety degrees and is preferred just slightly greater than ninety degrees. If green peas are being frozen the physical shape of the peas makes the contacts different than if strawberries or cut pieces of peaches are being quick frozen.

The amount of heat transfer that is concerned with just raising or lowering temperatures is small in comparision to the latent heat of freezing and the latent heat of melting of water solutions. The specific heat of water is 1.00; of ice about .50; of iron .1162; of copper .0936; and of nickel .0934. The specific heat of sugar and the other substances is such that a figure of .25 is used for them. The only substance that changes state is water and the latent heat of freezing is 144 British thermal units per pound and, of course, its latent heat of melting from ice is the same.

Examples of mixtures of sugar solutions (sometimes with some solids present in them) that are placed on the tray surfaces that will contact the foodstuffs, are solutions of principally the hexose sugars containing, where it is easy to get them, combinations of levulose sufficient to give freezing points of zero degrees Fahrenheit or lower. In all cases, however, solutions with freezing points as low as approximately ten degrees Fahrenheit are necessary. Among many examples are—

A 59.0% sugar solution having a freezing temperature of approximately —3 F.
A 55.8% sugar solution having a freezing temperature of approximately 1 F.
A 52.0% sugar solution having a freezing temperature of approximately 6 F.
A 47.4% sugar solution having a freezing temperature of approximately 11 F.

The air-blast was not only found to quick freeze the foodstuffs at their freezing temperatures but to cool the frozen material to minus ten degrees Fahrenheit in some cases and the metal of the freezing trays has been noted at temperatures as low as minus twenty degrees Fahrenheit.

In carrying out the freezing of strawberries, blueberries, green peas, cut beans, as examples, a seventy percent and a seventy-five to seventy-six percent sugar solution was put on the surfaces of the trays where they would contact the comestibles—at room temperature and with the conditions cold (cold made the film thicker). The trays were loaded and went immediately into the zero or below air-blast. After freezing it was found, on the basis of refractometer tests, that the material right at the surface of the trays was of fifty-five percent Brix and then by the same refractometer test the reading was forty-seven Brix at the same relative spots when the additions of heat had allowed the frozen foodstuff to drop out of the trays.

The following are the heat transfers that have occurred in the heating to release the mass of frozen foodstuff. They are the numerical figures obtained although the accuracy is not of the same order as in usual thermochemical work.

Raising the temperature of a 20 pound tray 30 degrees F., 30 x .1162 x 20 is about 70 B. t. u.
In melting the high concentration solution and raising its temperature about 48 B. t. u.
Heat transfer as specific heat of frozen fruit, about 80 B. t. u.

The tray of frozen material is passed over and in contact with a large iron plate as it comes out of the freezing chamber and this is heated by being the top of a hot water container.

The heat is applied to the tray largely by contact for the four sides of the tray have bases that directly contact the heated surface maintained at its temperature by hot water. The tray is quickly transferred to the position where it is inverted and allowed to fall with a thump against rods to allow the frozen mass of fruit to drop out. It does not clear absolutely complete from the screen in all cases. This operation is adjusted in regular running of the equipment by varying loading, time in the freezing chamber and time of heating so that all go together for steady production. Various ways of putting the surface film of solution on the sides of the trays that will be next to the fruit have been tried but hand applications with long handled applicators have been most satisfactory.

I claim:

1. In an airblast quick freezing process for foodstuffs, steps comprising coating such surfaces of the containers as will contact the foodstuff while it is being frozen with a solution having a freezing temperature much lower than that of the foodstuff, filling the foodstuff units into the containers, quick freezing the foodstuff, adding heat to the outside container surfaces and dumping the frozen foodstuff out of the holding container.

2. In an air-blast quick freezing process for quick freezing fruits and vegetables, steps comprising covering the surfaces of the tray, that is to hold the comestible while it is being frozen, and at those surfaces where the tray will contact the comestible, with a high concentration soluble solids content solution having a much lower freezing temperature than the comestible frozen, then loading the tray with the comestible units, then immediately freezing the comestible, then heating the outside surfaces of the tray causing latent heat of melting to liquify water in the concentrated film at the inside surface of the tray while the temperature remains below the melting point of ice and then removing the frozen comestible from the tray before the cold from the internal areas of comestible has rehardened the low freezing point temperature film.

HARRY A. NOYES.

REFERENCES CITED

The following references are of record in the file of this patent:

UNITED STATES PATENTS

| Number | Name | Date |
| --- | --- | --- |
| 1,920,222 | Taylor | Aug. 1, 1933 |
| 2,374,452 | Noyes | Apr. 24, 1945 |
| 2,424,870 | Welling | July 29, 1947 |